(No Model.)  2 Sheets—Sheet 2.

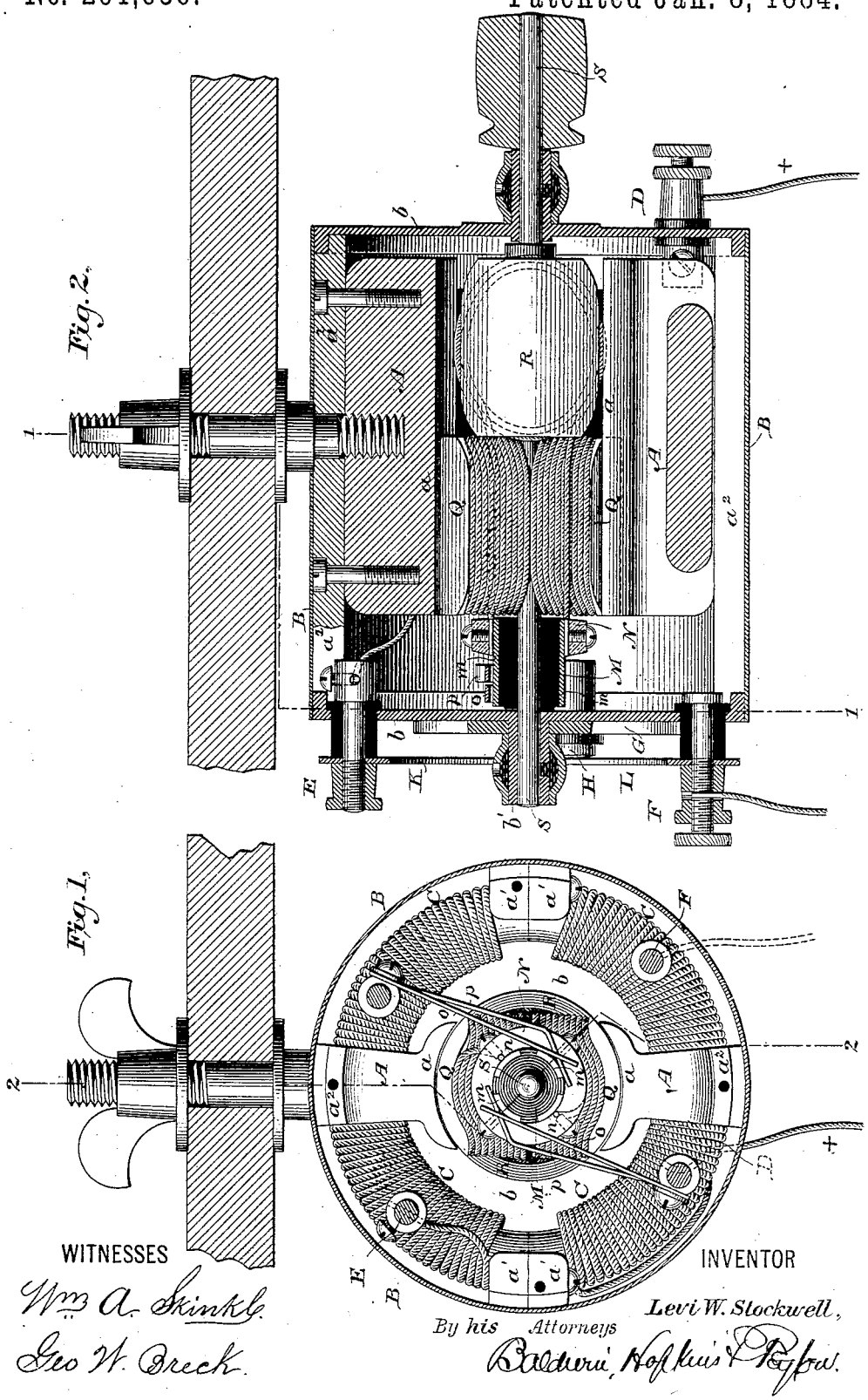

L. W. STOCKWELL.
ELECTRIC MOTOR.

No. 291,636. Patented Jan. 8, 1884.

WITNESSES
Wm A. Skinkle
Geo. W. Breck

INVENTOR
Levi W. Stockwell,
By his Attorneys
Baldwin, Hopkins & Peyton

UNITED STATES PATENT OFFICE.

LEVI W. STOCKWELL, OF CLEVELAND, OHIO.

ELECTRIC MOTOR.

SPECIFICATION forming part of Letters Patent No. 291,616, dated January 8, 1884.

Application filed September 20, 1883. (No model.)

*To all whom it may concern:*

Be it known that I, LEVI W. STOCKWELL, a citizen of the United States, residing in the city of Cleveland, county of Cuyahoga, and State of Ohio, have invented certain new and useful Improvements in Electric Motors, of which the following is a specification.

The object of my invention is to produce an electric motor in which a maximum effect may be obtained from a given electro-motive force, and in which the rotation of the armature-shaft will be caused by continuous action of the field-magnet on the armatures, and not by unconnected periodic impulses of attraction or repulsion.

A further object of my invention is to provide an improved switch or device for running the motor in either direction, and for stopping it by rendering the armature neutral, so that the field-magnet acts as a brake to arrest its motion.

While these are the leading features of my invention, there are other details of novelty fully set forth hereinafter.

Figure 5:
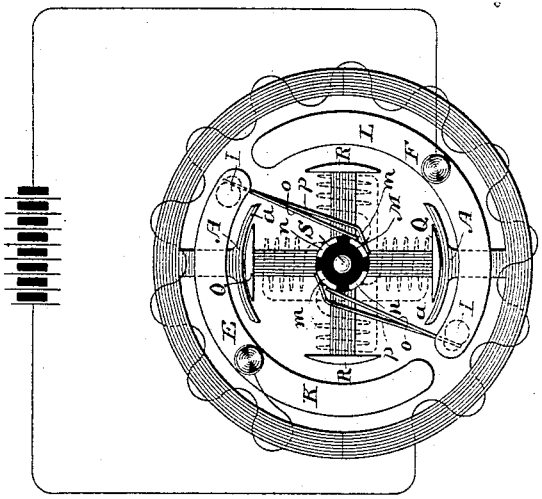
Figure 4:
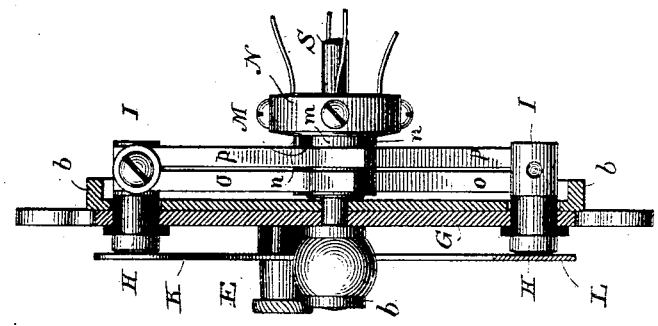
Figure 3:
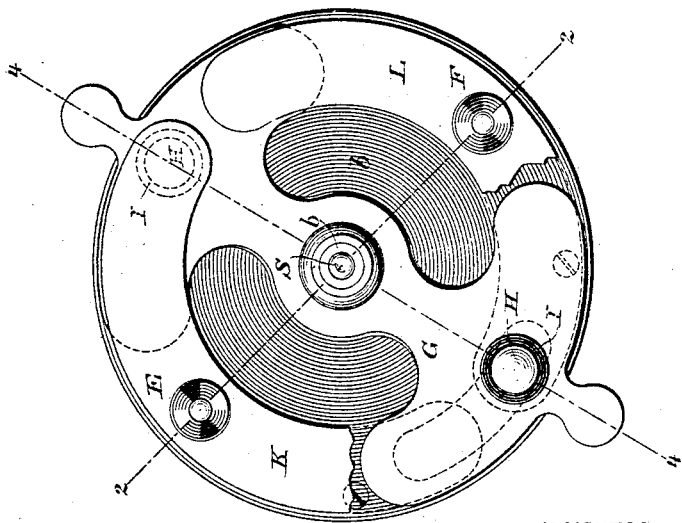

In the accompanying drawings, Figure 1 is a transverse section on the line 1 1 of Fig. 2. Fig. 2 is a longitudinal section on the line 2 2 of Fig. 1. Fig. 3 is an elevation of the front end of the motor, showing the controlling-switch, with the parts partly broken away. Fig. 4 is a transverse section through a portion of the motor on the line 4 4 of Fig. 3, showing more especially the arrangement of the controlling-switch and commutator. Fig. 5 is a diagram view, illustrating the circuits and winding of the field-magnet and armature coils.

The field-magnet A A is supported by the end pieces, $b$, of the casing or jacket B. It is shown as circular in cross-section, and having its poles $a$ projecting inwardly. The magnet is supported by the elongated ends $a'$, which abut against the end pieces, $b$, of the casing, and are sustained by suitable bolts or screws, and also by bars $a^2$, of non-magnetic material, bolted to the field-magnet opposite its poles, and sustained by the end pieces of the casing. The poles $a$ of the field-magnet preferably extend beyond their coils C on each side, and project inwardly somewhat. They are also enlarged transversely, and present the arc of a circle in cross-section. The coil C is wound continuously around the cores of the field-magnet in the ordinary way, and one end is connected with a binding-post, D, on the rear end piece of the motor, to which the wire from the positive pole of the battery or source of electric energy is connected, and the opposite end of the coil is connected with a binding-post, E, on the opposite end piece of the motor. The wire from the negative pole of the battery is connected with a binding-post, F, also on the front end piece of the machine. The binding-posts are of course all properly insulated from the casing of the motor. The front end piece $b$ is formed with a projecting hub, $b'$, which constitutes one bearing of the motor-spindle S, and also serves as a bearing for the pivoted rocking switch-plate G, which carries on its opposite ends contact-buttons H on the ends of insulated bolts or posts I, which project through curved slots in the end piece, $b$, and carry the commutator-brushes, as is hereinafter described. The insulated binding-posts E and F support semicircular contact-plates K L. (Illustrated in Fig. 3, in which figure the full outlines of the plates are indicated by dotted lines.) The ends of the contact-plates K L are in such close proximity that when the switch-lever G is turned so as to bring the contact-buttons H between the ends of the contact-plates these plates bear upon the buttons at both ends. In this position the circuit through the coils of the field-magnet will be as follows: Starting from the positive binding-post D, the circuit runs through the coils of the field-magnet to the binding-post E, contact-plate K, contact-buttons H, and opposite plate, L, to the binding-post F and negative pole of the battery. In this position the circuit will of course be shunted from the commutator-brushes. There will be no current through the armature-coils, and the motor will be at rest.

I will now proceed to describe the construction and connections of the armature magnets and coils. I remark here, however, that the special construction and arrangement of field magnet or magnets, and devices already described, may of course be varied, so far as the other features of my invention, which remain to be described, are concerned; and of course the same principles of construction illustrated may be also applied to different forms of machines, either of circular or rectangular construction, without in any way departing from the principles of the organization.

The armature-spindle S, which rotates within the circle of the radial field-magnet poles, has its bearings in the end pieces of the casing, and carries near one end, just inside the end piece, $b$, a hub of vulcanite or other suitable insulator, M, upon which the commutator-plates $m$ $m$ and $n\ n$ are arranged. A collar or flange, N, of some insulating substance, is also carried by this hub on the end adjacent to the armature-coils. The commutator-brushes or contact-fingers $o\ o\ p\ p$, carried by the insulated posts I, which project through the end piece, $b$, and carry the contact-buttons H, bear upon the face of the commutator-ring. Two armature-magnets, Q R, with their cores arranged at right angles to the armature-spindle and to each other, and with their greatest transverse width parallel with the spindle and with the length of the cores of the field-magnets, are carried on the spindle S. The poles of these armature-magnets are enlarged, so as to present the arc of a circle in transverse section, and revolve in close proximity to the correspondingly-curved poles of the field-magnet. The armature-magnet Q is wound continuously in the ordinary way, and the terminals of the wire are connected with the opposite commutator-contacts $n\ n$, while the terminals of the coil of the magnet R are connected with the opposite commutator-contacts $m\ m$. These connections may readily be traced in the drawings.

By turning the switch-lever G, which carries the posts I, the relation of the commutator-brushes $o\ p$ to the commutator-plates may be changed, so as to reverse the relative contacts illustrated in the drawings, and at the same time the contact of the buttons H and the plates K L is reversed. By swinging the switch-plate G, therefore, the polarity of the armature-magnets Q R may be reversed at pleasure, and the direction of the motor changed; or, by turning the plate to a central position, so that the buttons H come in contact with both of the plates K L, the current will be shunted from the armature-coils, but will still pass through the coils of the field-magnet, which, acting upon the neutral armature-poles, at once bring the armature to rest.

Referring now particularly to Fig. 1, it will be perceived that the commutator brushes, or fingers $o$ are straight, while the fingers $p$ are bent near their ends, so as to cross the straight end of the finger $o$ and give two points of contact to each pair of brushes. The purpose this arrangement is this: When the poles of one of the armature-magnets—say Q—is immediately opposite the poles of the field-magnet, as illustrated in Figs. 1 and 2, the coils of the armature-magnet Q will be entirely out of circuit, as there is no contact of the brushes $o\ p$ with the contact-plates $n\ n$. This magnet, therefore, offers a minimum opposition to the action of the field-magnet on the armature-magnet R. When, however, the spindle has rotated about twenty-five degrees, (more or less,) so as to bring the poles of both armature-magnets into a favorable position to be acted on by the field-magnet, the bent ends of the brushes $p$ make contact with the commutator-plates $n$, while the brushes $o$ still maintain contact with the plates $m$. The current is therefore divided and passes through the coils of both armature-magnets, so that the poles of the field-magnet act on both of them, and a maximum effect is obtained. As the poles of the magnet R come opposite the poles of the field-magnet the brushes $o$ pass from the contact-plates $m$ onto the plates $n$, so that the coil of the magnet R is cut out of the circuit, and the full current is sent through the coil of the magnet Q. This operation continues as the armature-spindle is rotated, and it will be perceived that the field-magnet acts continuously upon the armature-magnets, either upon one magnet only, through the coil of which the whole battery-current is passing when the poles of the other magnet are directly in line with the poles of the field-magnet, or upon both armature-magnets when they have passed from the poles of the field-magnet.

The details of construction last described may of course be varied without changing the principle of operation herein set forth. For instance, but one commutator-brush having a curved end could be employed in place of each pair of brushes $p\ o$; but such an arrangement would not be so good, as it would be difficult to insure contact at the desired points, whereas by employing a pair of crossed brushes perfect contacts at the desired points are insured.

The coils of the armature, it will be seen, are wound so that their greatest length is parallel with the armature-spindle, and with the poles of the field-magnet. The poles of the field-magnet are equal in length to the combined length of the poles of the armature-magnets. By arranging the coils of the armature-magnets as described, a maximum effect is produced; and this construction, in connection with the method of working by successively sending the current through both, and then through one only of the coils, according to the positions they occupy relatively to the field-magnet poles, gives most satisfactory and improved results.

Of course, instead of employing a field-magnet of such a width as to give a pole equal in length to the combined lengths of the armature-magnets, two field-magnets in line with each other might be employed in place of each elongated magnet illustrated; but they should be arranged so that the field on each side of the armature-spindle will have a uniform polarity, so far as part of my invention is concerned. Other parts of the invention are not dependent upon such an arrangement.

I construct the commutator by cutting grooves in the face of the hub of vulcanite or insulating material, and letting the commutator-plates into the grooves. The plates are held in place by the ring N, through which the ends of the armature-coils pass, and are clamped in contact with the plates by screws passing through the ring. I find this construction to be superior to that in which the commutator-ring is formed by attaching the strips to the face of a hub of insulating material, and then filling the spaces between the strips, as in the latter construction there is a liability for the parts to loosen and for oil to work in between the plates and the hub.

A pulley, s, either for a cord or band, may be carried upon the end of the spindle to transmit the power of the motor, as may be desired.

A full-sized motor, especially designed for running sewing-machines and such like machinery, is shown in the drawings. The same principles of construction and operation may of course be carried out on a larger scale for heavier work. The motor may be attached to any frame by means of a screw-bolt, of non-magnetic material, and thumb-screw, as illustrated in the drawings.

The action of the field-magnet upon the armature-magnets is continuous, as described, so that the motion is more steady and a greater power is developed than has heretofore been the case in motors of the class illustrated.

It will be observed that the extended pieces $a'$, which support the magnets, are at the neutral parts of the field-magnet. I consider this a superior construction to that in which the magnet is supported by extension-pieces running from the poles, as in the latter case the magnet is more diffused and is less powerful at the effective point in the motor. The pieces $a'$ may be entirely sufficient to support the field-magnet; but I prefer for greater strength to also employ the non-magnetic bars $a^2$, extending from the poles. For the same reason I prefer to make the bolt T, by means of which the special motor illustrated may be secured to its frame, also of non-magnetic material.

This application describes and claims certain subjects-matter described in applications filed by me December 19, 1882, and May 19, 1883, and respectively numbered 79,705 and 94,470. The present case, however, supersedes and cancels the said earlier applications, so far as any subjects-matter common to the several applications are concerned, and such subjects-matter have been distinctly disclaimed in the earlier applications.

I claim as my invention—

1. The combination, substantially as set forth, of the opposite adjacent field-magnet poles, the armature-magnets arranged transversely to each other and rotating between said poles, the field on each side of the armature being of uniform polarity, the armature-coils wound parallel with the poles of the field-magnet and with their axis of rotation and at right angles to their plane of rotation, the commutator-contacts with which the armature-coils are connected, and the brushes bearing on said contacts and connected with the source of electric energy.

2. The combination, substantially as set forth, of the opposite adjacent poles of the field-magnet, the armature-magnets arranged transversely to each other and rotating between the opposite effective faces of said poles, the polarity of the field on each side of the armatures being uniform, the commutator-contacts with which the armature-coils are connected, the brushes bearing on said contacts, and an electric circuit common to said brushes.

3. The combination, substantially as set forth, of the field-magnet having elongated radially-projecting poles, the armature-magnets which rotate centrally between the poles and are arranged transversely to each other and have their coils wound with the greatest length parallel with the elongated poles of the field-magnet, the commutator-contacts, and the brushes bearing thereon and arranged to send the current successively first through one of the armature-coils, then through both of the coils, and then through the other armature-coil, according to their positions relatively to the field-magnets, as described.

4. The combination, substantially as set forth, of the field-magnet, the armature-coils, a single commutator-ring, the commutator-contacts with which the coils are connected, and the commutator-brushes arranged in pairs, one pair on each side of the commutator-ring, to give an extended or double point of contact on each side of the commutator-ring to make connection with one contact before connection with the adjacent one is broken.

5. The combination, substantially as set forth, of the field-magnet, the armature-coils, the commutator-ring, and the commutator-brushes arranged to make contact first with the contact-plates with which one armature-coil only is connected, and then with both sets of contact-plates, for the purpose described.

6. The combination, substantially as set forth, of the field-magnet poles, the transversely-arranged armature-magnets, and electrical connections and contacts by which each armature-magnet is cut out of the circuit during a portion of a revolution.

7. The combination, substantially as set forth, of the field-magnet, the armature, the commutator ring and brushes, the switch or controlling device, and the contact buttons and plates by which, when the switch is in one position, the current is shunted from the armature-coils, and when moved in one direction from the neutral line sends the current through the armature-coils in one direction, and when put over to the opposite side sends the current in the reverse direction.

8. The combination, substantially as set forth, of the field-magnet, the armature-coils, the commutator-ring, a switch-lever pivoted concentrically with the commutator-ring, the brushes carried by said lever, the contacts through which the battery is shunted from the armature-coils but still flows through the field-magnet coils, and the contacts by which the direction of the current through the armature coils may be reversed by moving the switch-lever to change the direction of the motor.

9. The combination, substantially as set forth, of the field-magnet, the armature, the commutator-ring, the switch-lever, the brushes carried thereby, and electrical contacts through which by the movement of the lever the commutator-brushes are adjusted on the ring and the direction of the current through the armature-coil simultaneously reversed.

10. The combination, substantially as set forth, of the casing or magnet-supports, the field-magnet, and the supporting-extensions of the magnets projecting from the neutral part.

11. The combination, substantially as set forth, of the field-magnet, the supporting-projections extending from the neutral part, the supporting-casing, and supporting-bars, of non-magnetic material, extending from the poles of the magnets to the casing.

12. The combination, substantially as set forth, of an electric motor and a bolt or support, of non-magnetic material, connected with the pole or active part of the field-magnet for attaching the motor to its support.

In testimony whereof I have hereunto subscribed my name this 17th day of September, A. D. 1883.

LEVI W. STOCKWELL.

Witnesses:
D. DAVIDSON,
E. C. DAVIDSON.